United States Patent
Yang et al.

(12)

(10) Patent No.: US 11,215,884 B1
(45) Date of Patent: Jan. 4, 2022

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventors: Yong Yang, Hubei (CN); Guowei Zha, Hubei (CN); Guiyang Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 174 days.

(21) Appl. No.: 16/651,853

(22) PCT Filed: Nov. 12, 2019

(86) PCT No.: PCT/CN2019/117471
§ 371 (c)(1),
(2) Date: Mar. 27, 2020

(87) PCT Pub. No.: WO2021/047016
PCT Pub. Date: Mar. 18, 2021

(30) Foreign Application Priority Data

Sep. 10, 2019 (CN) .......................... 201910852973.0

(51) Int. Cl.
G02F 1/1347 (2006.01)
G02F 1/1335 (2006.01)
G02F 1/1334 (2006.01)

(52) U.S. Cl.
CPC ...... *G02F 1/13476* (2013.01); *G02F 1/13345* (2021.01); *G02F 1/133562* (2021.01); *G02F 1/133567* (2021.01)

(58) Field of Classification Search
None
See application file for complete search history.

(56) References Cited

U.S. PATENT DOCUMENTS

2005/0206814 A1* 9/2005 Histake ................. G02F 1/1323
349/112
2019/0215509 A1* 7/2019 Woodgate ............. G02F 1/1337

FOREIGN PATENT DOCUMENTS

CN 109656068 A * 4/2019

* cited by examiner

*Primary Examiner* — Phu Vu

(57) ABSTRACT

A display panel and a display device are provided. The display panel includes a backlight module, a light-control liquid crystal cell, a collimating film layer, and a display liquid crystal cell stacked from bottom to top. The collimating film layer is configured to limit transmission of scattered light beams with large angle. The display device includes the abovementioned display panel.

10 Claims, 3 Drawing Sheets

DISPLAY PANEL AND DISPLAY DEVICE

FIELD

The present disclosure relates to display technologies, and more particularly, to a display panel and a display device.

BACKGROUND

Liquid crystal display (LCD) technologies have been available for many years. Compared with the emerging organic light emitting diode (OLED) display technologies, LCD has a disadvantage in display contrast. In order to make up for this shortcoming, a sub-millimeter light-emitting diode (Mini-LED) backlight technology developed in recent years can achieve a dynamic high-contrast display through partitioned backlight control to compete with a contrast ratio of the OLED display technology, and can achieve high brightness, which is favored by people. However, because Mini-LED lamp board technologies use chip arrays mounted on FPC/PCB, and most of them also use whole-face packaging. The cost of materials such as substrates, chips, packaging adhesives, and membranes has led to higher production costs for the Mini-LEDs. A current market acceptance is not high.

As shown in FIG. 1, for a display with a low thickness requirement, a dual-cell thick liquid crystal display technology may be adopted. One layer of the liquid crystal cell is a light-control liquid crystal cell 91, and the other layer of the liquid crystal cell is a display liquid crystal cell 92. Among them, light emitted by a backlight module 90 (indicated by an arrow in FIG. 2) passes through the light-control liquid crystal cell 91 and the display liquid crystal cell 92 in sequence. Most of the light-control liquid crystal cell 91 uses polymer dispersed liquid crystal (PDLC), and the PDLC still has a high transmittance in a dark state, which is not conducive to a control of light in the dark state and is easy to leak light.

Therefore, how to improve light control characteristics of the light-control liquid crystal cell in the dark state becomes the key to improving the contrast of the dual-cell liquid crystal display. Therefore, there is a need to solve the above issues.

SUMMARY

In view of the above, the present disclosure provides a display panel and a display device to promote a transmission of a light-control liquid crystal cell, to ensure a luminance in white state of a duel-cell liquid crystal display device, and to realize a high brightness and high contrast display by reduce light leakage of a light-control liquid crystal cell in dark state.

In order to achieve above-mentioned object of the present disclosure, one embodiment of the disclosure provides a display panel including a backlight module, a light-control liquid crystal cell, a collimating film layer, and a display liquid crystal cell stacked from bottom to top. In detail, the light-control liquid crystal cell is disposed on the backlight module. The collimating film layer is disposed on the light-control liquid crystal cell, and is configured to limit transmission of scattered light beams with large angle. The display liquid crystal cell is disposed on the collimating film layer. The light-control liquid crystal cell includes a light-control upper substrate, a light-control lower substrate, and a polymer dispersed liquid crystal layer disposed between the light-control upper substrate and the light-control lower substrate. The display liquid crystal cell includes a display upper substrate, a display lower substrate, and a liquid crystal layer disposed between the display upper substrate and the display lower substrate.

In one embodiment of the disclosure, the display panel further includes a lower polarizer disposed under the display liquid crystal cell, and an upper polarizer disposed on the display liquid crystal cell.

In one embodiment of the disclosure, the display panel further includes a cover disposed on the display liquid crystal cell.

In one embodiment of the disclosure, the collimating film layer is a film layer with alternately stacked silicon nitride and silicon oxide.

In one embodiment of the disclosure, a number of film layers of the collimating film layer ranges from 10 layers to 50 layers.

In one embodiment of the disclosure, a thickness of the collimating film layer ranges from 100 nm to 1000 nm.

In one embodiment of the disclosure, the backlight module includes one of a blue-light backlight plate, a side-emitting backlight module, or a mini-LED backlight module.

In one embodiment of the disclosure, a material of the liquid crystal layer includes thermotropic liquid crystal or lyotropic liquid crystal, and a material of the liquid crystal includes biphenyl liquid crystal, phenylcyclohexane liquid crystal or ester liquid crystal.

In one embodiment of the disclosure, a material of the polymer dispersed liquid crystal layer includes a scattering liquid crystal, and the scattering liquid crystal includes a plurality of liquid crystal molecules and a network polymer.

Furthermore, another embodiment of the disclosure provides a display device including the display panel abovementioned.

In comparison with prior art, the display panel and the display device of the disclosure provides a dual-cell thick liquid crystal display technology included a light-control liquid crystal cell and a display liquid crystal cell to promote a transmission of a light-control liquid crystal cell, to ensure a luminance in white state of a duel-cell liquid crystal display device, and to realize a high brightness and high contrast display by reduce light leakage of a light-control liquid crystal cell in dark state. It compensates a difference of contrast between LCD display technologies and OLED display technologies and ensures an advantage in cost of the LCD display technologies to the OLED display technologies.

Reference numbers of the present disclosure are as follows:
10: backlight module, 20: light-control liquid crystal cell, 21: light-control upper substrate, 22: polymer dispersed liquid crystal layer, 23: light-control lower substrate, 30: collimating film layer, 40: display liquid crystal cell, 41: display upper substrate, 42: liquid crystal layer, 43: display lower substrate, 44: lower polarizer, 45: upper polarizer, 50: cover, 100: display panel.

DETAILED DESCRIPTION

The following description of the embodiments is provided by reference to the drawings and illustrates the specific embodiments of the present disclosure. Directional terms mentioned in the present disclosure, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

Figure 1:
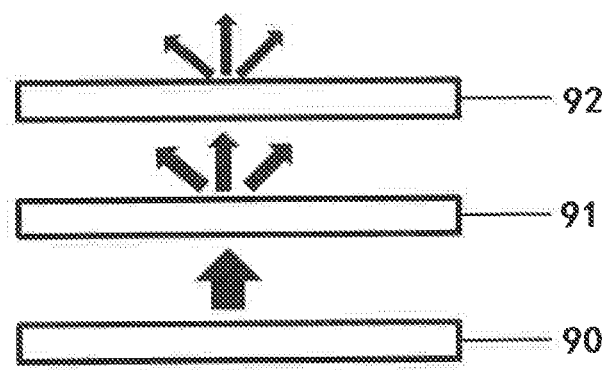
FIG. 1 is a schematic view of a principle of light leakage of a display device according to prior art.
Figure 2:
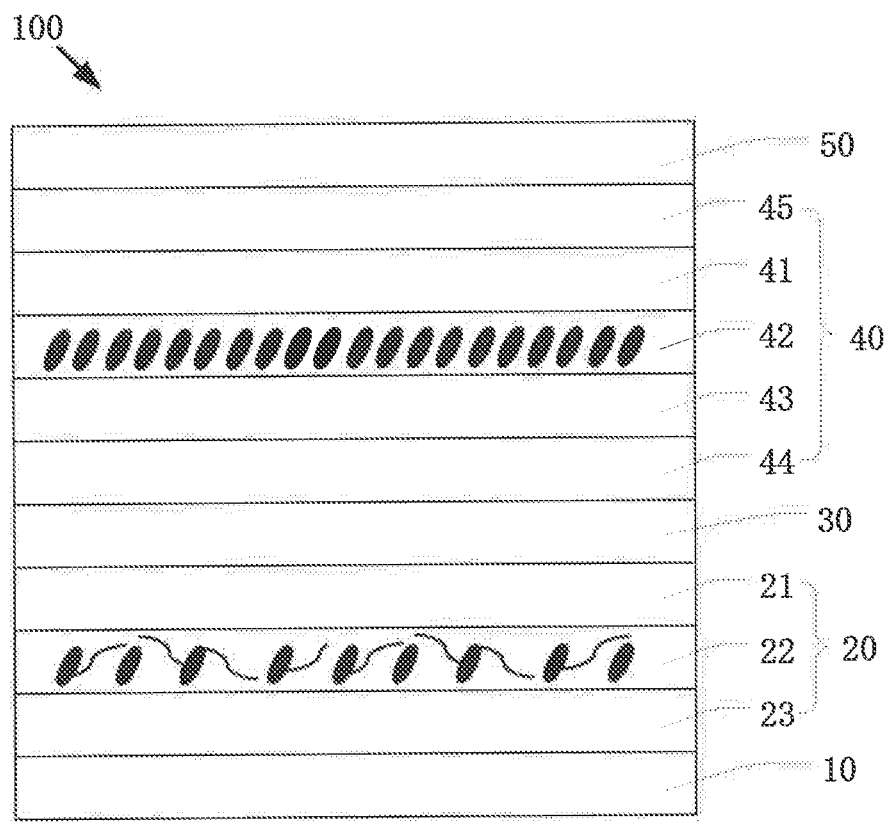
FIG. 2 is a schematic view of a structure of a display device according to an embodiment of the present disclosure.
Figure 3:
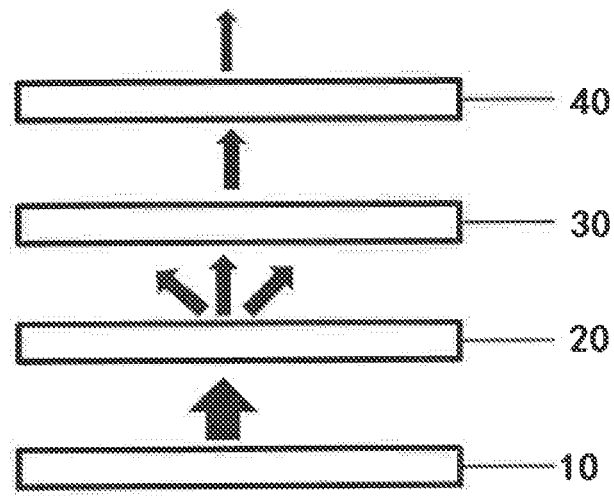
FIG. 3 is a schematic view of light beams of a light-control liquid crystal cell in a scattered state according to an embodiment of the present disclosure.

Referring to FIG. 2, one embodiment of the disclosure provides a display panel 100 including a backlight module 10, a light-control liquid crystal cell 20, a collimating film layer 30, and a display liquid crystal cell 40 stacked from bottom to top. In detail, the light-control liquid crystal cell 20 is disposed on the backlight module 10. The collimating film layer 30 is disposed on the light-control liquid crystal cell 20, and is configured to limit transmission of scattered light beams with large angle. The display liquid crystal cell 40 is disposed on the collimating film layer 30. The light-control liquid crystal cell 20 includes a light-control upper substrate 21, a light-control lower substrate 23, and a polymer dispersed liquid crystal layer 22 disposed between the light-control upper substrate 21 and the light-control lower substrate 23. The display liquid crystal cell 40 includes a display upper substrate 41, a display lower substrate 43, and a liquid crystal layer 42 disposed between the display upper substrate 41 and the display lower substrate 43.

Figure 4:
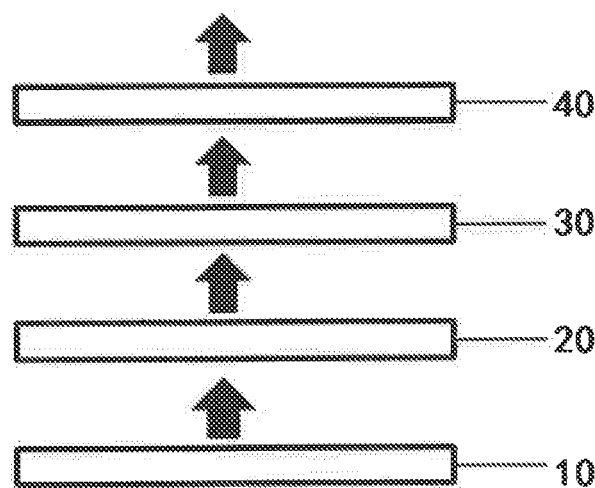
FIG. 4 is a schematic view of light beams of a light-control liquid crystal cell in a transparent state according to an embodiment of the present disclosure.

Referring to FIGS. 1, 2, 3, and 4, FIG. 3 shows that the display panel 100 includes the collimating film layer 30, and the collimating film layer 30 is configured to limit transmission of scattered light beams (as shown in arrows in the figure) with large angle to improve light leakage when the light-control liquid crystal cell 20 is at a scattered state. FIG. 4 is a schematic view of light beams of a light-control liquid crystal cell 20 in a transparent state. The light-control liquid crystal cell 20 has high transmission and the collimating film layer 30 do not limit light beams with small angle, so that the luminance of the display panel 100 won't be affected seriously.

The light-control liquid crystal cell 20 and the collimating film layer 30 jointly implement a light-control function. The display mode of the light-control liquid crystal cell 20 is TN mode. A pixel electrode and a common electrode are respectively located on the light-control upper substrate 21 and on the light-control lower substrate 23. In order to increase the transmittance of the light-control liquid crystal cell 20, it is preferable that the light-control upper substrate 21 has no color film photoresist and black matrix photoresist, and no upper and lower polarizer structures. The light-control lower substrate 23 can control the liquid crystal rotation of the polymer dispersed liquid crystal layer 22 to switch between a high-fog scattered state and a transparent state. A driving voltage of the light-control liquid crystal cell 20 is ±(5V to 7V).

In one embodiment of the disclosure, the collimating film layer 30 is a film layer with alternately stacked silicon nitride and silicon oxide. The collimating film layer 30 includes a silicon oxide layer 31 and a silicon nitride layer 32.

Figure 5:
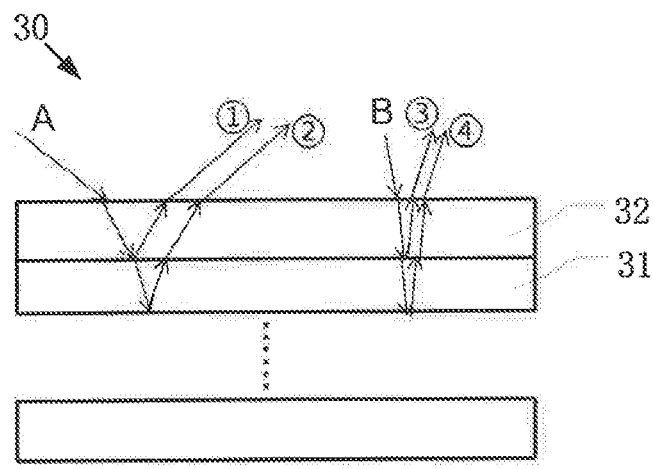
FIG. 5 is a schematic view of a principle of a collimating film layer configured to limit transmission of scattered light beams with large angle according to an embodiment of the present disclosure.

As shown in FIG. 5, the collimating film layer 30 is an angle light-control film layer of multi-layer structure of the silicon oxide layer 31 and the silicon nitride layer 32. Referring to a light beam with a small angle such as a light ray B in FIG. 5, a reflected light is refracted by two film layers to from a reflected light 3 and a reflected light 4 on a surface. If the phase difference between the reflected light 3 and the reflected light 4 is a, a reflectance is 0 based on the principle of destructive interference. In light energy conservation principle, light is basically transmitted through the film layer, so small-angle light can be transmitted. A light beam with a large angle such as a light ray A in FIG. 5, will generate reflected light 1 and reflected light 2, because an optical path difference between the reflected light 1 and the reflected light 2 is different from the reflected light 3 and the reflected light 4 and does not satisfy destructive interference. If the reflected light is reflected on the surface of the film layer, light of the light ray A transmitted through the film layer is reduced. The optical path difference is related to a thickness and refractive index of the film layer. An appropriate designed film thickness can satisfy that most of the light with large angle is reflected, and most of the light with small angle can be emitted.

In one embodiment of the disclosure, a number of film layers of the collimating film layer ranges from 10 layers to 50 layers. In one embodiment of the disclosure, a thickness of the collimating film layer ranges from 100 nm to 1000 nm. The collimating film layer 30 can pass light in an angle range of 0° to 40° perpendicular to the plane where the collimating film layer 30 is located, that is, the collimating film layer 30 can pass light in an angle range within 40°.

Figure 6:
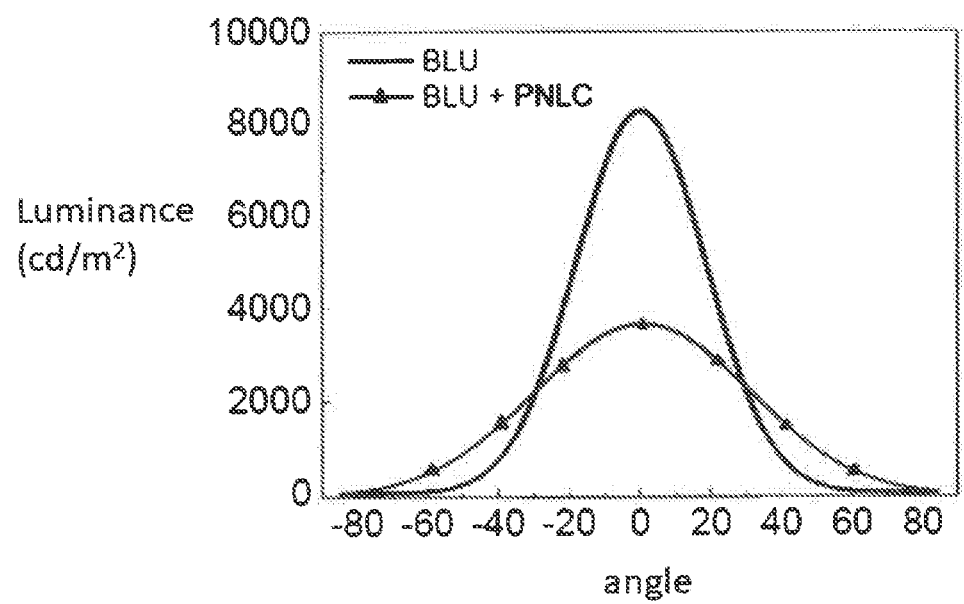
FIG. 6 is a schematic view of a comparison between contrast according to an embodiment of the present disclosure and contrast according to prior art.

As shown in the embodiment of FIG. 6, A BLU curve represents a curve of the brightness of a polymer dispersed liquid crystal layer (PDLC) of an existing display device as a function of angle in a transparent state. A BLU+PDLC curve represents a curve of the brightness of the light-control liquid crystal cell 20 as a function of angle in the scattered state. Without the collimating film layer 30, the average contrast ratio of full viewing angle can be considered as a ratio between the area enclosed by the two curves. Addition of the collimating film layer 30 extracts light outside 40°, especially extracts light outside 30°. A removal proportion of the area of the BLU+PDLC curve is larger, and the removal proportion of the area of the BLU curve is small. The ratio of an area enclosed by the BLU curve to an area enclosed by the BLU+PDLC curve will increase, and the average contrast ratio of full viewing angle will increase.

In one embodiment of the disclosure, the liquid crystal layer is a common liquid crystal. A material of the liquid crystal layer 42 includes thermotropic liquid crystal or lyotropic liquid crystal. A material of the liquid crystal includes biphenyl liquid crystal, phenylcyclohexane liquid crystal or ester liquid crystal. In one embodiment of the disclosure, a material of the polymer dispersed liquid crystal layer 22 includes a scattering liquid crystal, and the scattering liquid crystal includes a plurality of liquid crystal molecules and a network polymer. It can switch between transparent state and screen display state.

The liquid crystal layer 42, an ordinary liquid crystal, undergoes rotation of liquid crystal molecules after a voltage is applied to control light transmittance to achieve gray-scale display. The polymer dispersed liquid crystal layer 22 adds certain polymers with different refractive indices. The difference in refractive index between the surface of the liquid crystal and the network polymer is controlled by voltage, so that light is transmitted or scattered on the surface of the two. A transparent state or a scattered state can be achieved. In the transparent state, light can be transmitted, and in the scattered state, light can be scattered. It can be used for displaying images.

The detail work process of the polymer dispersed liquid crystal layer 22 is as following: The liquid crystal and the network polymer have the same anisotropic dielectric constant, and both have a birefringence phenomenon. When an applied voltage is higher than a threshold voltage, the liquid crystal molecules rotate and their directions are aligned along a vertical direction, which changes the anisotropy of the dielectric constant of the liquid crystal. In the light vector direction, the refractive index of the liquid crystal and the network polymer are equivalent. There is no refractive index difference on the surface between the liquid crystal and the network polymer, and light is not scattered here. The light-control liquid crystal cell 20 is in the transparent state. When no voltage is applied or the voltage is lower than the threshold voltage, the liquid crystal molecules are aligned horizontally, the refractive index of the liquid crystal and the network polymer are greatly different in the light vector direction, and light is scattered here. The light-control liquid crystal cell 20 exhibits a scattered state.

A liquid crystal material of the polymer dispersed liquid crystal layer 22 and a liquid crystal material of the liquid crystal layer 42 is the same. Preferably, the polymer dispersed liquid crystal layer 22 has a high polymer network content, and the light-control liquid crystal cell 20 in the scattered state has more scattered light at a large angle. The light leakage in the dark state is more serious, and the light control effect is limited. In the scattered state, the transmittance of the light-control liquid crystal cell 20 is still more than 40%.

The collimating film layer 30 in this embodiment can suppress scattered light at a large angle and pass light at a small angle. The light-control effect is significantly improved, which effectively reduces light leakage of the light-control liquid crystal cell 20 in dark state. The transmittance of the light-control liquid crystal cell 20 is improved to ensure a luminance in white state of a duel-cell liquid crystal display device, and to realize a high brightness and high contrast display by reduce light leakage of a light-control liquid crystal cell in dark state. It compensates a difference of contrast between LCD display technologies and OLED display technologies and ensures an advantage in cost of the LCD display technologies to the OLED display technologies.

A cell thickness of the light-control liquid crystal cell 20 satisfies $\Delta nd=\lambda/4$, where $\Delta n$ is the anisotropy of the refractive index of the liquid crystal, d is the cell thickness, $\Delta nd$ is the optical path difference, $\lambda$ is a wavelength, and $\lambda$ ranges from 380 nm to 780 nm. The $\lambda$ value is preferably 500 nm, 550 nm, or 600 nm.

Continuing to refer to FIG. 2, in this embodiment, the display panel 100 further includes: a lower polarizer 44 disposed below the display liquid crystal cell 40 and an upper polarizer 45 disposed above the display liquid crystal cell 40. In detail, a display mode of the display liquid crystal cell 40 is a TN mode, a VA mode, or an IPS/FFS mode. The display upper substrate 41 includes a color film photoresist and a black matrix photoresist. A driving voltage of the display liquid crystal cell 40 is ±(4V to 6V). Preferably, a green pixel and a red pixel of the color film photoresist are made of a quantum dot color filter (QDCF) material. A high color gamut display is realized when takes a blue light as an excitation light.

The cell thickness of the light-control liquid crystal cell 20 satisfies $\Delta nd=\lambda/4$, where $\Delta n$ is the anisotropy of the refractive index of the liquid crystal, d is the cell thickness, $\Delta nd$ is the optical path difference, $\lambda$ is a wavelength, and $\lambda$ ranges from 380 nm to 780 nm. The $\lambda$ value is preferably 500 nm, 550 nm, or 600 nm.

In one embodiment of the disclosure, the display panel 100 further includes a cover 50 disposed on the display liquid crystal cell 40 to protect the display panel 100.

In one embodiment of the disclosure, the backlight module 10 includes one of a blue-light backlight plate, a side-emitting backlight module 10, or a mini-LED backlight module 10.

Furthermore, another embodiment of the disclosure provides a display device including the display panel 100 abovementioned.

The display device of the present invention can be applied to various occasions and can be combined with various devices and structures. It can be a display panel or other equipment with a display function, such as a tablet computer, a television, a display window, and the like. It should be understood that, in order to realize the function, the display device of the present invention is provided with other devices, structures, etc., which are not shown in this specification.

In comparison with prior art, the display panel and the display device of the disclosure provides a dual-cell thick liquid crystal display technology included a light-control liquid crystal cell and a display liquid crystal cell to promote a transmission of a light-control liquid crystal cell, to ensure a luminance in white state of a duel-cell liquid crystal display device, and to realize a high brightness and high contrast display by reduce light leakage of a light-control liquid crystal cell in dark state. It compensates a difference of contrast between LCD display technologies and OLED display technologies and ensures an advantage in cost of the LCD display technologies to the OLED display technologies.

The present disclosure has been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:

1. A display panel, comprising:
   a backlight module;
   a light-control liquid crystal cell disposed on the backlight module;
   a collimating film layer disposed on the light-control liquid crystal cell, and configured to limit transmission of scattered light beams with large angle; and
   a display liquid crystal cell disposed on the collimating film layer;
   wherein the light-control liquid crystal cell comprises a light-control upper substrate, a light-control lower substrate, and a polymer dispersed liquid crystal layer disposed between the light-control upper substrate and the light-control lower substrate; and wherein the display liquid crystal cell comprises a display upper substrate, a display lower substrate, and a liquid crystal layer disposed between the display upper substrate and the display lower substrate.

2. The display panel according to claim 1, further comprising:
   a lower polarizer disposed under the display liquid crystal cell; and
   an upper polarizer disposed on the display liquid crystal cell.

3. The display panel according to claim 1, further comprising:
   a cover disposed on the display liquid crystal cell.

4. The display panel according to claim 1, wherein the collimating film layer is a film layer with alternately stacked silicon nitride and silicon oxide.

5. The display panel according to claim 1, wherein a number of film layers of the collimating film layer ranges from 10 layers to 50 layers.

6. The display panel according to claim 1, wherein a thickness of the collimating film layer ranges from 100 nm to 1000 nm.

7. The display panel according to claim 1, wherein the backlight module comprises one of a blue-light backlight plate, a side-emitting backlight module, or a mini-LED backlight module.

8. The display panel according to claim 1, wherein a material of the liquid crystal layer comprises thermotropic liquid crystal or lyotropic liquid crystal, and a material of the liquid crystal comprises biphenyl liquid crystal, phenylcyclohexane liquid crystal or ester liquid crystal.

9. The display panel according to claim 1, wherein a material of the polymer dispersed liquid crystal layer comprises a scattering liquid crystal, and the scattering liquid crystal comprises a plurality of liquid crystal molecules and a network polymer.

10. A display device comprising the display panel according to claim 1.

* * * * *